(12) United States Patent  (10) Patent No.: US 7,995,040 B2
Adenau                     (45) Date of Patent:    Aug. 9, 2011

(54) METHOD FOR OPERATING A LIGHTING CONTROL CONSOLE AND LIGHTING CONTROL CONSOLE

(75) Inventor: Michael Adenau, Würzburg (DE)

(73) Assignee: MA Lighting Technology GmbH, Waldbuttelbrunn (DE)

( * ) Notice: Subject to any disclaimer, the term of this patent is extended or adjusted under 35 U.S.C. 154(b) by 713 days.

(21) Appl. No.: 12/061,533

(22) Filed: Apr. 2, 2008

(65) Prior Publication Data

US 2009/0190327 A1 Jul. 30, 2009

(30) Foreign Application Priority Data

Jan. 28, 2008 (DE) .................. 10 2008 006 444

(51) Int. Cl.
G09G 5/00 (2006.01)
F21V 33/00 (2006.01)
(52) U.S. Cl. .......................................... 345/173; 362/85
(58) Field of Classification Search .................. 345/156, 345/168, 169, 173, 174; 361/679.11, 679.13, 361/679.14, 679.16, 679.17, 679.55, 679.1; 362/85; 463/37, 38; 700/83–87
See application file for complete search history.

(56) References Cited

U.S. PATENT DOCUMENTS

| 5,659,768 | A * | 8/1997 | Forbes et al. ................. 715/201 |
| 2006/0022956 | A1 | 2/2006 | Lengeling et al. |
| 2006/0026521 | A1 | 2/2006 | Hotelling et al. |
| 2006/0167572 | A1 * | 7/2006 | Fluss ............................... 700/83 |
| 2006/0242607 | A1 * | 10/2006 | Hudson ........................ 715/863 |
| 2007/0103447 | A1 * | 5/2007 | Varian et al. .................. 345/173 |
| 2007/0116334 | A1 * | 5/2007 | Fidrich et al. ................. 382/128 |
| 2007/0252821 | A1 * | 11/2007 | Hollemans et al. ........... 345/173 |
| 2008/0012849 | A1 | 1/2008 | Snyder et al. |

OTHER PUBLICATIONS

Virtuoso Control Console Specification, Vari*Lite, 1998.
Virtuoso DX Console Specification, Vari*Lite, 2001.

\* cited by examiner

Primary Examiner — Amare Mengistu
Assistant Examiner — Stacy Khoo
(74) Attorney, Agent, or Firm — Quarles & Brady LLP

(57) ABSTRACT

A method for operating a lighting control console for controlling a lighting system includes generating digital adjustment commands in the lighting control console. The digital adjustment commands are transmittable via data connections to lighting devices of the lighting system. The lighting control console includes at least one digital processor and at least one digital memory for generating, managing and storing the adjustment commands. The lighting control console further includes at least one display unit, and wherein graphical elements can be displayed graphically for the operator on the display unit. The display unit includes a touch-sensitive sensor surface, wherein touching the touch-sensitive sensor surface in the area of a contact surface on the display unit enables an operator input associated with each of these contact surfaces to be selected. Detection of contact with the touch-sensitive sensor surface in the area of a first contact surface associates a first operator input with the first contact surface. Detection of simultaneous touching of the touch-sensitive sensor surface in the area of at least a second contact surface associates a second operator input with the second contact surface. The first and second operator inputs are then processed further.

14 Claims, 3 Drawing Sheets

METHOD FOR OPERATING A LIGHTING CONTROL CONSOLE AND LIGHTING CONTROL CONSOLE

CROSS REFERENCES TO RELATED APPLICATIONS

This application claims the priority benefit of German Patent Application No. 10 2008 006 444.0 filed on Jan. 28, 2008, which is fully incorporated herein by reference.

STATEMENT REGARDING FEDERALLY SPONSORED RESEARCH

Not Applicable

TECHNICAL FIELD

The invention relates to a method for operating a lighting control console, which is itself provided to control a lighting system. The invention further relates to a lighting control console for carrying out the inventive method.

DESCRIPTION OF THE BACKGROUND ART

Generic lighting control consoles are used to control lighting systems such as are used for example in theaters or concert stages. These lighting systems usually include a large number of lighting devices, for example stage spotlights, wherein the lighting devices may also be switched individually in a variety of ways between a plurality of lighting conditions, for example different colors. These different lighting conditions are stored and controlled by means of programmable parameters in the lighting control console's lighting program.

For this purpose, standard lighting systems may include as many as several thousand lighting devices. In order to be able to control such complex lighting systems, the generic lighting control consoles are equipped with a digital processor that enables digital data and signal processing. A digital memory is also provided for storing the data, and particularly makes it possible to store lighting programs.

In order to configure the lighting program and to control the program while it is running, the operator must enter operating commands. Such commands may be intended to select a certain lighting device or adjust a certain parameter, for example. Mechanical control elements, such as pushbuttons, rotary knobs, or slide controls are provided on the known lighting control consoles so that these operating commands may be entered. The operating commands assigned to the individual control elements may be altered by appropriate menu changes so that complex lighting programs may be configured and controlled accordingly.

The known lighting control consoles have the disadvantage that entering operating commands is becoming more and more difficult due to the high degree of complexity of the lighting programs. The operator must switch between a plurality of submenus just to enter the various parameters of a single lighting device, which militates against intuitive and fast understanding of the lighting control console's mode of operation with respect to the complex lighting programs.

SUMMARY OF THE INVENTION

Based on this prior art, the object of the present invention is therefore to propose a novel method for operating a lighting control console that offers greater convenience when configuring and controlling lighting programs. A further object of the invention is to propose a lighting control console with which the method according to the invention may be carried out.

The invention is based on the fundamental idea that the display unit includes a touch-sensitive sensor surface, via which contacts are detected when the user's fingers touch contact surfaces. In this way, the contact surfaces of the touch-sensitive sensor surface may replace the mechanical control elements of known lighting control consoles. The method according to the invention is further characterized in that contact with the touch-sensitive sensor surface may be detected not only in one contact surface but in at least two different contact surfaces at the same time. In this way, the user may thus touch the touch-sensitive sensor surface at several points simultaneously, thereby making several operator inputs at the same time. This simultaneous entry of multiple operator inputs corresponds to the user's accustomed method of configuring and controlling lighting control consoles that are equipped with mechanical control elements. It is precisely considered an advantage of the mechanical control elements, for example mechanical pushbuttons, slide controls and rotary knobs, that the operator is able to adjust several of these mechanical control elements at the same time. For example, if the brightness of several lighting devices is to be faded at the same time, it is extremely advantageous for the lighting system if the slide controls that are assigned to the lighting devices are able to be moved down simultaneously to adjust the brightness.

As a result, the method according to the invention thus enables the lighting control console operation that is familiar to operators who have used the mechanical control elements to be transferred to a lighting control console on which the touch-sensitive sensor surface of the display unit is used for making operator inputs.

According to a preferred embodiment of the method according to the invention, several control elements are displayed on the display unit in the form of symbols. In this context, the control elements may particularly be buttons, slide controls or rotary knobs in symbol form. An operator input is assigned to each of these control elements by configuring the software. When the operator touches the contact-sensitive sensor surface in the area of two of the control elements shown, he is able to select both operator inputs at the same time for further processing in the lighting control console's digital processor.

In the simplest form, multiple buttons appear on the display unit as symbols, so that the operator is able to press the touch-sensitive sensor surface in the area of the buttons displayed and thus select the operator controls associated therewith by the software for further processing.

On the other hand, if slide controls or rotary knobs are shown on the display unit, a simple selection by pressing these slide controls or rotary knobs is not enough in itself. By their basic nature, slide controls and rotary knobs serve to set a given parameter within a predefined adjustment range. In order to be able to achieve this with the method according to the invention, the position of the contact surface on the various slide controls and rotary knobs is detected progressively, particularly at regular time intervals, thereby enabling the movement of the contact surface to be detected within the adjustment range of the slide control or rotary knob. This makes it possible to determine the point within the adjustment range at which the operator has set the slide control or rotary knob.

The method according to the invention may also be used preferably for entering operating commands via various menu levels. On the known lighting control consoles, the operating commands are often organized in main menus and submenus having various structures, that is to say with differing hierarchical depths. The selection of individual operating commands at different menu levels may be simplified substantially by the simultaneous detection of the operator's touch.

The method according to the invention is particularly important for configuring the lighting parameters of a control element that is actuated by the lighting control console. In order to simplify this configuration, it is proposed that touching a first operator element selects a functional element, particularly a lighting element. If a second control element, for example a slide control, is touched at the same time, the parameter of the selected functional element may then be adjusted, thereby lending the overall method an exceptionally intuitive operating feel. According to a further variation of the method according to the invention, a contiguous display area delimited in two dimensions appears on the display unit. A partial display area may then be selected by touching the display area in two contact surfaces, and when it has been selected this partial display area may then be enlarged directly. All zooming operations for enlarging individual graphic elements in the display area may thus be simplified considerably and controlled intuitively.

The geometry of the partial display area is generally freely definable. The partial display area should preferably be rectangular, and the position of two non-adjacent end points of the rectangular partial display area is then defined by the position of the contact surfaces in the display area. This means that the height and width of the rectangular partial display area may be defined directly by touching the display area in two places, and may then be enlarged immediately.

According to a further variation of the method according to the invention, a color palette is displayed on the display unit. Then, one or more color distances may be defined by touching the color palette in two or more contact surfaces. The definition of such color distances is extremely important, particularly when configuring lighting control consoles, and has previously been very time-consuming.

Additionally, a time bar may also be displayed on the display unit, wherein a time interval to be selected is defined by the position of the contact surfaces in the display area. Thus the configuration of chronological sequences of the lighting program in particular may be simplified considerably. Individual events within the lighting program may be positioned chronologically in a simple manner and time intervals may be defined and changed without difficulty.

A further variation of the method relates to the configuration of diaphragm apertures on lighting devices. Apertures of this kind may be delimited from the edges by attaching diaphragm sliders or shutters to define a given illumination area. According to the method variant, the diaphragm aperture of the lighting element is displayed on the display unit as a symbol. The position of the diaphragm slider that partially shutters the diaphragm aperture of the lighting element is then defined by the position of the contact surfaces relative to this diaphragm aperture in the display area.

Parameterizing curve progressions, for example of the lighting characteristics of individual lighting elements, and changing the position and size of objects displayed in three dimensions are also rendered significantly easier by the method according to the invention. In order to perform the method according to the invention, a lighting control console having a display unit that is equipped with a touch-sensitive sensor surface is proposed. The touch-sensitive sensor surface must be equipped in such a manner that it is able to detect simultaneous touching of the sensor surface in the area of at least two contact surfaces. In this way, it is possible to evaluate this simultaneous touching of the two contact surfaces, each of which is associated with an operator input, and the operator inputs associated with the contact surfaces may be selected.

BRIEF DESCRIPTION OF THE DRAWINGS

Various features of the invention are represented schematically in the drawing and will be explained for exemplary purposes hereinafter. In the figures.

DETAILED DESCRIPTION OF THE PREFERRED EMBODIMENTS

Figure 1:
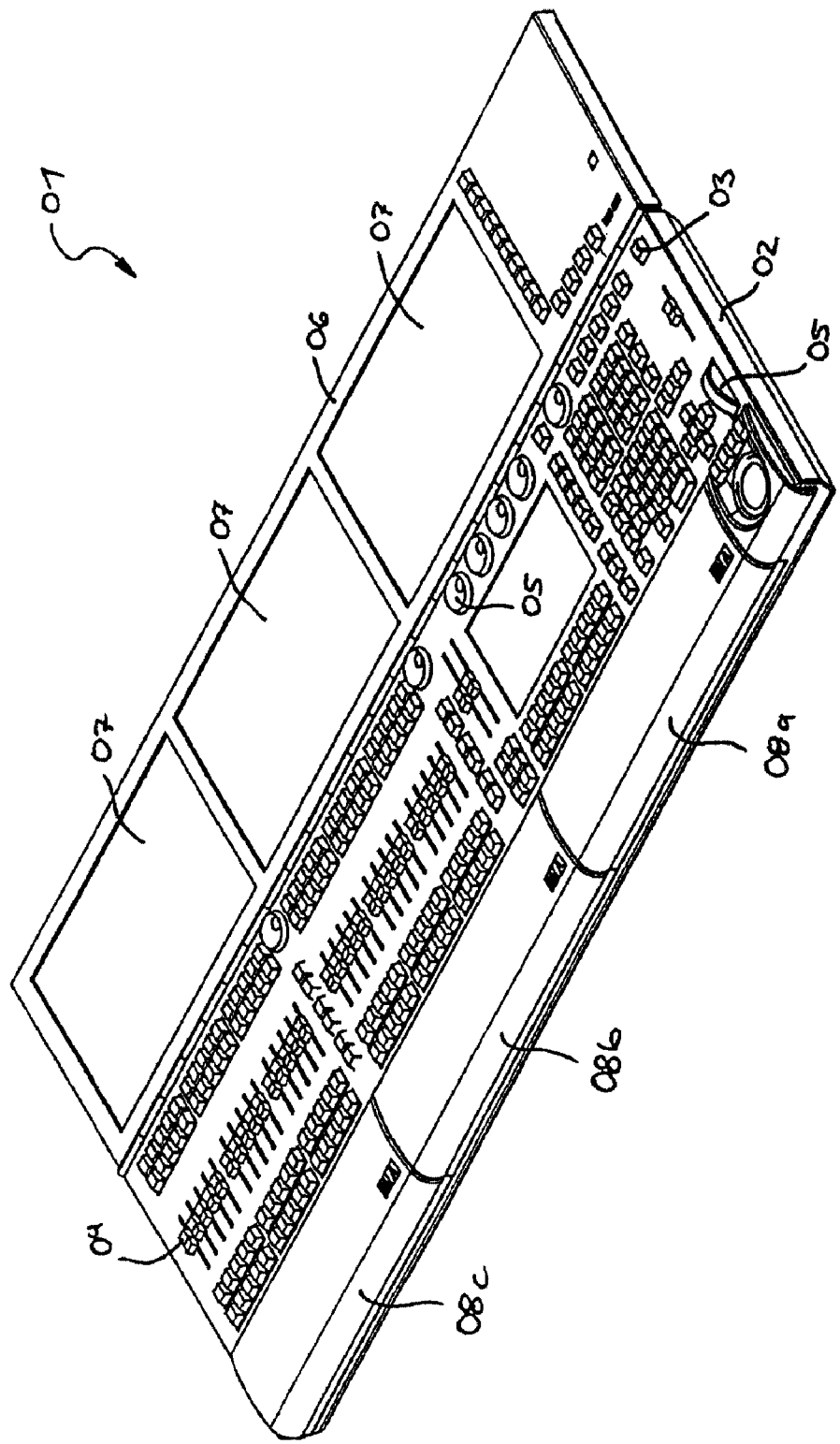
FIG. 1 is a top perspective view of a lighting control console having a plurality of display units, to each of which a touch-sensitive sensor surface is assigned.

FIG. 1 shows a lighting control console for controlling a complex lighting system. The housing 02 contains a plurality of digital processors and digital memories for creating, transmitting and storing digital adjustment commands. A large number of control elements, particularly buttons 03, slide controls 04, and rotary knobs 05, are arranged on the top of the housing 02. The lighting control console 01 is also equipped with a swiveling support 06, on which three touch-sensitive display units 07 are provided. The touch-sensitive display units 07 enable simultaneous contact of the sensor surface in multiple contact surfaces to be detected.

Figure 2:
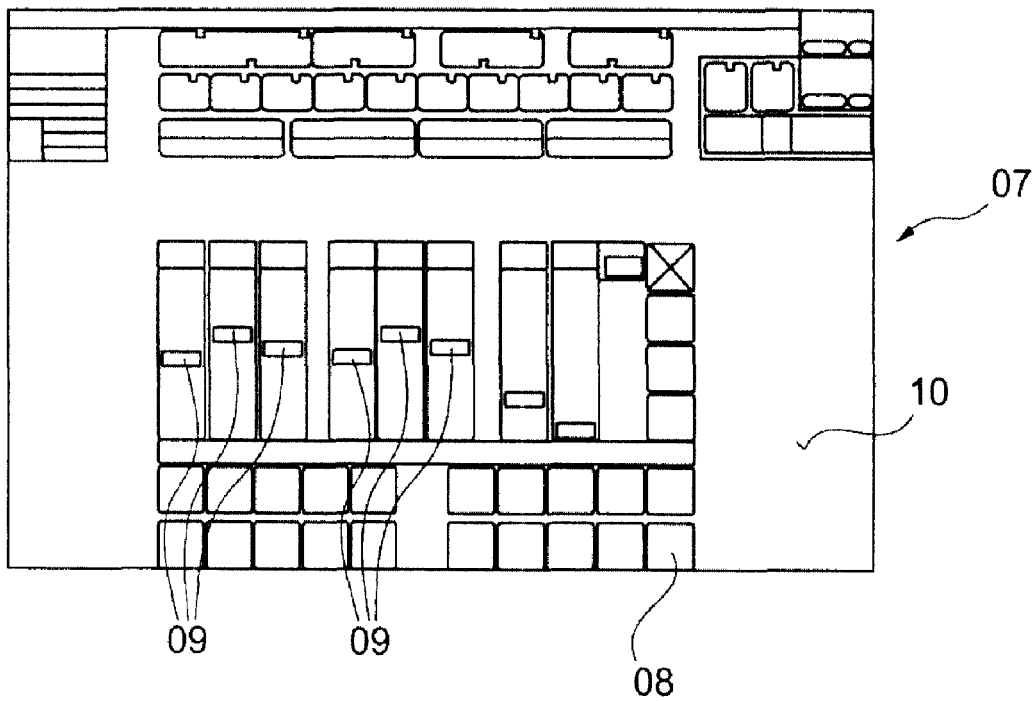
FIG. 2 shows a display unit with a touch-sensitive sensor surface of the lighting control console of FIG. 1 showing multiple control elements, particularly slide controls and buttons.

FIG. 2 shows a display unit 07 displaying a first operation scenario with several pushbuttons 08 represented symbolically and several slide controls 09 represented symbolically, each of which may be moved in linear manner along a predefined adjustment path to parameterize specified functional elements. When the display unit 07 with its touch-sensitive contact surface 10 is used, simultaneous contact by the operator's fingers may thus be detected in several places. This enables the operator to make several operator inputs at the same time by touching several buttons 08 simultaneously. The operator is also able to touch several slide controls 09 at the same time and move them synchronously with each other.

Figure 3:
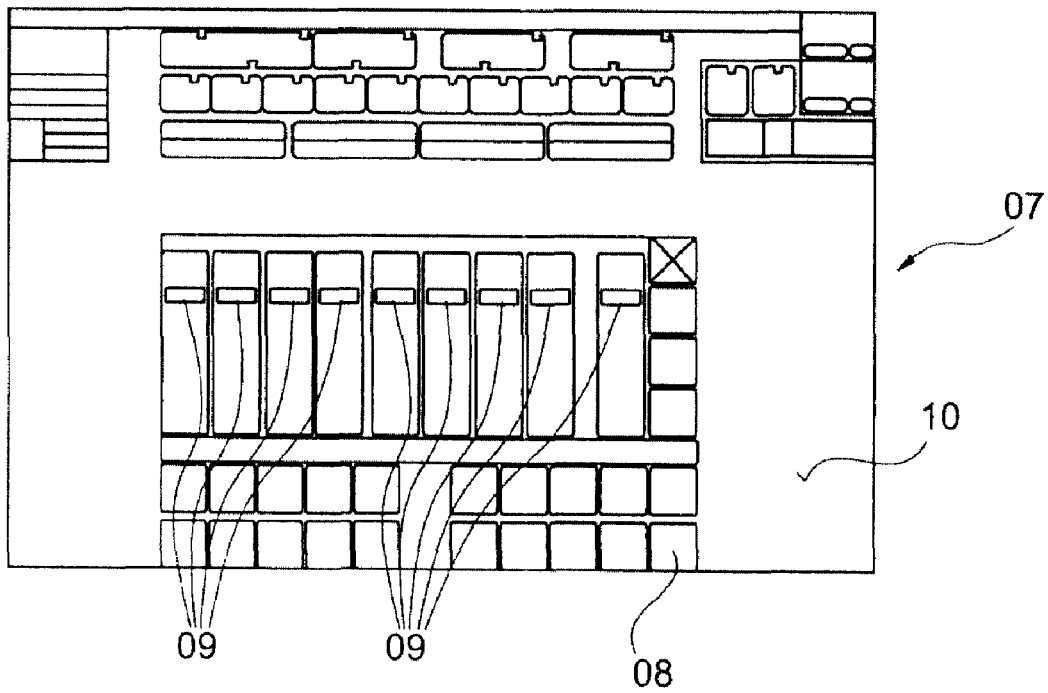
FIG. 3 shows the display unit of FIG. 2 after several control elements have been actuated.

FIG. 3 shows the display unit 07 after the slide controls 09 have all been placed at the same level.

Figure 4:
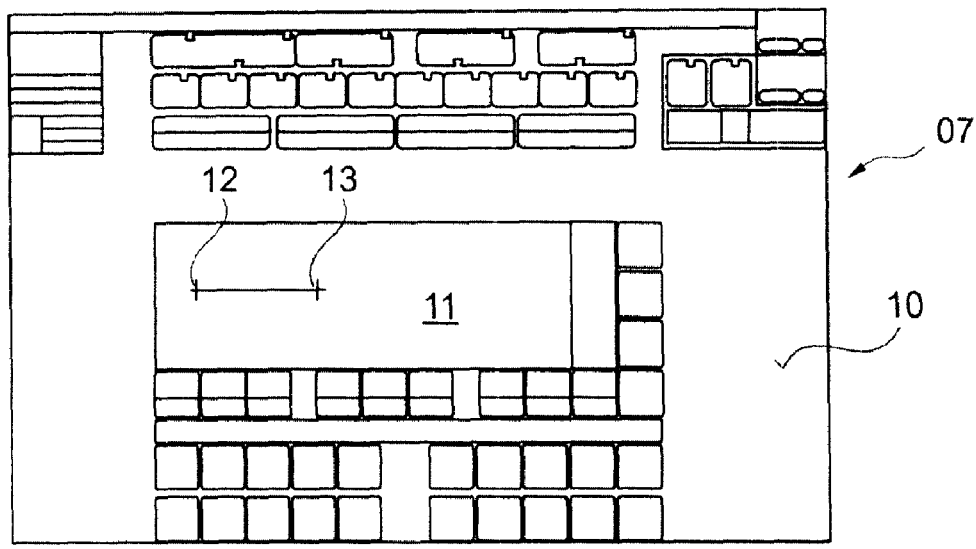
FIG. 4 shows the display unit of FIG. 2 showing a color palette.

FIG. 4 shows the display unit 07 as it is displaying a color palette 11. The color distance of two lighting devices and the corresponding color for example may be selected by touching the color palette 11 in the two contact surfaces 12 and 13.

Figure 5:
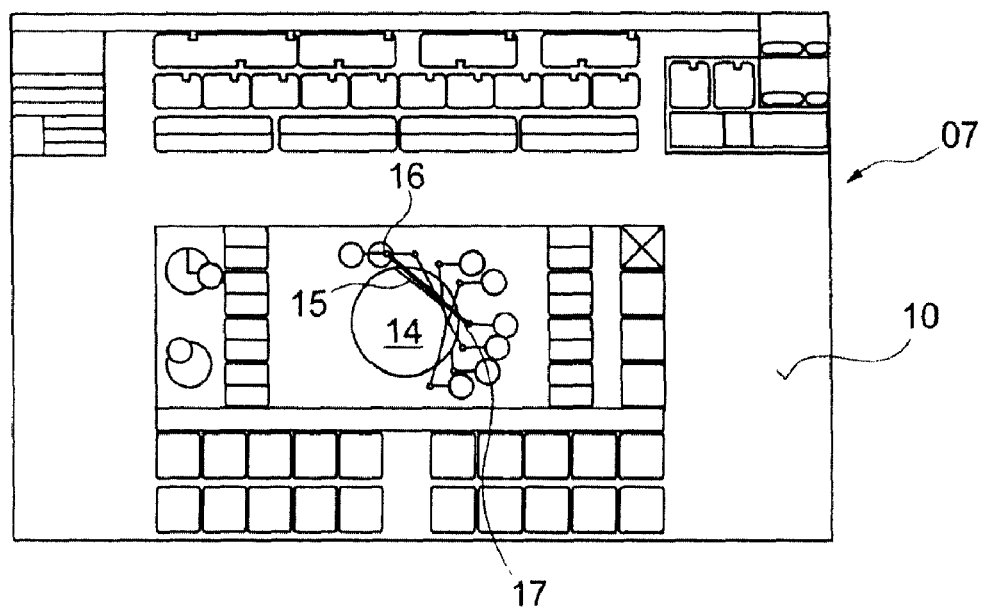
FIG. 5 shows the display unit of FIG. 2 showing the diaphragm aperture of a control element.

FIG. 5 shows the display unit 07 as it is showing another operation scenario for configuring the diaphragm sliders on the diaphragm aperture of a lighting element. The circular diaphragm aperture 14 is shown as a symbol, and the position of various diaphragm sliders 15 that partially shutter the diaphragm aperture 14 is defined by touching the touch-sensitive sensor surface 10 in two contact surfaces 16 and 17, respectively.

I claim:

1. A method for operating a lighting control console for controlling a lighting system, wherein digital adjustment commands are generated in the lighting control console and are able to be transmitted to lighting devices of the lighting system via data connections, and wherein the lighting control console includes at least one digital processor and at least one digital memory for generating, managing and storing the adjustment commands, and wherein the lighting control console includes at least one display unit, and wherein graphical elements are able to be displayed graphically for the operator on the display unit, wherein the display unit includes a touch-sensitive sensor surface, wherein touching the touch-sensitive sensor surface in the area of a contact surface on the display unit enables an operator input associated with each of these contact surfaces to be selected, and wherein
   a) contact with the touch-sensitive sensor surface in the area of a first contact surface is detected, wherein a first operator input is associated with the first contact surface;
   b) simultaneous touching of the touch-sensitive sensor surface in the area of at least a second contact surface is detected, wherein a second operator input is associated with the second contact surface;
   c) the first and second operator inputs are processed further;
   in which a diaphragm aperture of at least one of the lighting devices is displayed as a symbol on the display unit, wherein the position of a diaphragm slider that partially shutters the diaphragm aperture of the at least one of the lighting devices is defined by the position of the first contact surface and the second contact surface.

2. The method as recited in claim 1, in which several control elements are displayed on the display unit and
   a) contact with the touch-sensitive sensor surface in the area of a first control element is detected, wherein a first operator input is associated with the first control element;
   b) simultaneous touching of the touch-sensitive sensor surface in the area of a second control element is detected, wherein a second operator input is associated with the second control element;
   c) the first and second control elements are processed further.

3. The method as recited in claim 2, in which multiple buttons can be displayed as control elements on the display unit at the same time, wherein an operator input is associated with each button.

4. The method as recited in claim 2, in which multiple slide controls and/or rotary knobs are displayed as control elements on the display unit, wherein an adjustment range is assigned to each slide control and/or rotary knob, and wherein the position of the contact surfaces on the various slide controls and/or rotary knobs is detected progressively, particularly at regular time intervals.

5. The method as recited in claim 2, in which an operating command is assigned to at least two control elements wherein the operating commands belong to different menu levels.

6. The method as recited in claim 2, in which touching a first control element selects a functional element of the lighting system, particularly a lighting device, and touching at least one other control element adjusts a parameter of the selected functional element.

7. The method as recited in any claim 1, in which a contiguous display area delimited in two dimensions appears on the display unit, wherein a partial display area is selected by touching a first contact surface in the display area and touching at least a second contact surface in the display area, and wherein the selected partial display area is then displayed enlarged on the display unit.

8. The method as recited in claim 7, in which the partial display area is rectangular, wherein the position of two non-adjacent end points of the rectangular partial display area is defined by the position of the contact surfaces in the display area.

9. The method as recited in claim 1, in which a color palette is displayed on the display unit, wherein a color distance to be selected is defined by the position of the contact surfaces of the color palette.

10. The method as recited in claim 1, in which a time bar is displayed on the display unit, wherein a time interval to be selected is defined by the position of the contact surfaces in the display area.

11. The method as recited in claim 1, in which a curve is displayed on the display unit, wherein the course of the curve can be changed by the position of the contact surfaces in the display area.

12. The method as recited in claim 1, in which an object is shown in three dimensions on the display unit, wherein the position and/or size of the objects can be changed by the position of the contact surfaces in the display area.

13. A lighting control console for controlling a lighting system, wherein digital adjustment commands are generated in the lighting control console and are able to be transmitted to the lighting devices of the lighting system via data connections, and wherein the lighting control console includes at least one digital processor and at least one digital memory for generating, managing and storing the adjustment commands, and wherein the lighting control console includes at least one display unit, and wherein graphical elements are able to be displayed graphically for the operator on the display unit, wherein
    the display unit includes a touch-sensitive sensor surface, wherein touching the touch-sensitive sensor surface in the area of contact surfaces on the display unit enables an operator input associated with each of these contact surfaces to be selected, and wherein touching in the area of at least two contact surfaces simultaneously can be detected on the lighting control console for performing the method according to claim 1, and wherein an operator input is associated with each contact surface and is selectable by touching in the area of this contact surface.

14. A method of operating a lighting control console for controlling a lighting system, said method comprising:
    generating digital adjustment commands in the lighting control console;
    transmitting said digital adjustment commands to lighting devices of the lighting system via data connections, said lighting control console including at least one digital processor and at least one digital memory for generating, managing and storing the adjustment commands, and said lighting control console further including at least one display unit;
    displaying graphical elements graphically on the display unit, said display unit including a touch-sensitive sensor surface, wherein touching the touch-sensitive sensor surface in the area of a contact surface on the display unit enables an operator input associated with each of these contact surfaces to be selected;
    associating a first operator input with a first contact surface of the touch-sensitive sensor surface upon detecting contact with the touch-sensitive sensor surface in the area of the first contact surface;

associating a second operator input with a second contact surface of the touch-sensitive sensor surface upon detecting simultaneous touching of the touch-sensitive sensor surface in the area of the first contact surface and the second contact surface; and processing the first and second operator inputs further;

in which a diaphragm aperture of at least one of the lighting devices is displayed as a symbol on the display unit, wherein the position of a diaphragm slider that partially shutters the diaphragm aperture of the at least one of the lighting devices is defined by the position of the first contact surface and the second contact surface.

* * * * *